United States Patent
Pettersson et al.

(10) Patent No.: US 12,278,970 B2
(45) Date of Patent: Apr. 15, 2025

(54) METHODS AND DEVICES FOR CONTROLLING A TRANSMISSION OF A VIDEO STREAM

(71) Applicant: Axis AB, Lund (SE)

(72) Inventors: Mattias Pettersson, Lund (SE); Björn Völcker, Lund (SE); Malte Johansson, Lund (SE)

(73) Assignee: AXIS AB, Lund (SE)

( * ) Notice: Subject to any disclaimer, the term of this patent is extended or adjusted under 35 U.S.C. 154(b) by 458 days.

(21) Appl. No.: 17/942,592

(22) Filed: Sep. 12, 2022

(65) Prior Publication Data

US 2023/0082211 A1  Mar. 16, 2023

(30) Foreign Application Priority Data

Sep. 16, 2021 (EP) .................................. 21197010

(51) Int. Cl.
| H04N 19/15 | (2014.01) |
| H04N 19/107 | (2014.01) |
| H04N 19/136 | (2014.01) |
| H04N 19/177 | (2014.01) |
| H04N 19/184 | (2014.01) |
| H04N 19/423 | (2014.01) |

(52) U.S. Cl.
CPC ........... *H04N 19/15* (2014.11); *H04N 19/107* (2014.11); *H04N 19/136* (2014.11); *H04N 19/177* (2014.11); *H04N 19/184* (2014.11); *H04N 19/423* (2014.11)

(58) Field of Classification Search
CPC ...................................................... H04N 19/15
USPC ..................................................... 375/240.13
See application file for complete search history.

(56) References Cited

U.S. PATENT DOCUMENTS

| 5,537,446 | A | 7/1996 | Lakshman et al. |
| 2004/0042548 | A1 | 3/2004 | Yu et al. |
| 2010/0166060 | A1 | 7/2010 | Ezure et al. |
| 2013/0142249 | A1 | 6/2013 | Chaurasia et al. |
| 2017/0099225 | A1 | 4/2017 | Dao |
| 2018/0139145 | A1 | 5/2018 | Stanwood et al. |
| 2018/0240502 | A1* | 8/2018 | Katsavounidis ........ H04L 65/80 |
| 2018/0270482 | A1* | 9/2018 | Edpalm ................ H04N 19/124 |

FOREIGN PATENT DOCUMENTS

EP  3829170 A1  6/2021

OTHER PUBLICATIONS

Extended European Search Report dated Feb. 22, 2022 for European Patent Application No. 21197010.8.

* cited by examiner

*Primary Examiner* — Yulin Sun
(74) *Attorney, Agent, or Firm* — Volpe Koenig

(57) ABSTRACT

A computer implemented method for controlling a transmission of a video stream is provided. The method comprises estimating a number of bits for a group of pictures, GOP, of the video stream to be transmitted, setting a latency requirement for the transmission of the video stream, determining an average minimum video bitrate across the GOP based on the estimated number of bits and a time corresponding to a time period represented by a duration of the GOP, for video frames in the GOP setting an output bitrate for transmission of a video frame based on the latency requirement and the average minimum video bitrate, and transmitting the video frame using the output bitrate.

14 Claims, 6 Drawing Sheets

Video stream shaper 400

Circuitry 420

Data size estimating function 421

Latency setting function 422

Bitrate determining function 423

Output bitrate setting function 424

Transmitting function 425

Main function 426

METHODS AND DEVICES FOR CONTROLLING A TRANSMISSION OF A VIDEO STREAM

FIELD OF INVENTION

The present disclosure belongs to methods and devices for controlling a transmission of a video stream.

TECHNICAL BACKGROUND

In video coding, a group of pictures, or GOP structure, specifies the order in which intra- and inter-frames are arranged. The GOP is a collection of successive pictures within a coded video stream. Each coded video stream comprises successive GOPs, from which the visible frames are generated. Encountering a new GOP in a compressed video stream means that the decoder doesn't need any previous frames in order to decode the next ones and allows fast seeking through the video. A GOP starts with an intra-frame and ends with the last frame in the group before the next intra frame in the coded video stream. The size of an intra-frame is generally significantly larger than the size of an inter-frame; typically, 10-50 times larger. Transmitting the coded video stream over a network hence result in a temporary transmission bitrate being relatively large while the intra-frame is transmitted whereas the transmission bitrate is relatively low while the subsequent inter-frames are transmitted. A bitrate spike thereby normally occurs while transmitting an intra-frame. Modern networks and internet connections can typically handle such bitrate spikes without compressing the video stream further. However, should a plurality of video cameras be installed in a specific network, an overall data transmission bitrate may momentarily exceed a maximum data transmission bitrate of the network, should a plurality of bitrate spikes occur simultaneously, even though there is, on average, sufficient bandwidth for the plurality of video cameras. This may result in a loss of data packets, reduced video quality, etc. Hence, there is a need to prevent such a transmission bitrate overload in a network.

SUMMARY

Providing an approach for controlling a transmission of a video stream to prevent a transmission bitrate overload in a network would be beneficial.

According to a first aspect, a computer implemented method for controlling a transmission of a video stream is provided. The method comprises estimating a number of bits for a group of pictures, GOP, of the video stream to be transmitted. The method further comprises setting a latency requirement for the transmission of the video stream. The method further comprises determining an average minimum video bitrate across the GOP based on the estimated number of bits and a time corresponding to a time period represented by a duration of the GOP. The method further comprises, for video frames in the GOP: setting an output bitrate for transmission of a video frame based on the latency requirement and the average minimum video bitrate; and transmitting the video frame using the output bitrate.

Traditionally, surveillance networks have been closed systems in which cables were installed permanently and in which transmission capacity have been ensured originating from, inter alia, predictable bitrate curves, etc. The present method may allow data from a surveillance camera to be transmitted over a network in which other traffic types may be transmitted. This may further be suitable should long-distance transmission of video data be done over a link in which transmission capacity cannot be guaranteed.

Compared to a classical data traffic shaper, where a maximum bitrate is set and fixed, the present disclosure provides a dynamic data traffic smoothener, which provides for a reduced load on a network over which data is transmitted. Further, transmission speed of data between other devices in the network may be facilitated due to said possibility to reduce load on the network per the above.

Throughout this text a bitrate refers to a number of bits per second being transmitted over a digital network. A bitrate curve refers to the bitrate being a function of time. A bitrate spike in a bitrate curve refers to a relatively short time interval of the bitrate curve during which the bitrate is significantly larger than an average bitrate, e.g., a time interval during which an intra-frame is transmitted. The referred network is any type of data transmission network (possibly wireless) in which transmission of the considered video frames occur if not explicitly stated otherwise. The network may be any type of network for communicating digital information, such as, e.g., a local network, a public network, etc. The wording "transmitting" and "pushing" data over a network may be interchangeably used throughout.

The average minimum video bitrate across the GOP is defined as the amount of data needed to be transmitted during each frame period so that all video data corresponding to the GOP will be transmitted during a GOP period. A frame period may be approximately 30-40 ms given, e.g., a GOP length of 30 frames captured at a 30 frames per second frame rate.

The method may facilitate smoothening of a bitrate curve of a GOP. Smoothening of a bitrate curve herein refers to a substantially constant transmission bitrate being an average bitrate along transmission of a GOP. This may prevent to momentarily exceed a maximum bitrate of a network in which the video stream is transmitted. Hence, a risk of losing information in, e.g., a live stream, may be reduced.

The latency refers throughout this description to a time interval wherein a start of the time interval is a time stamp on which a capturing or a generation of a video frame is done, and an end of the time interval is a time stamp on which the video frame has been transmitted. The latency requirement may thereby refer to a maximum acceptable such time interval. The method may facilitate a short latency time without compromising on video quality, which may be advantageous in, e.g., live streams.

The estimation of the number of bits may comprise statistically analyzing a number of bits for one or more preceding GOPs in the video stream. This may facilitate an appropriate estimation of the number of bits of a GOP to be transmitted. This may further facilitate dynamical properties of the data traffic smoothening, as a momentary minimum bitrate necessary for transmitting a forthcoming GOP is ongoingly monitored and updated.

The estimation of the number of bits may further comprise buffering video data corresponding to the GOP to be transmitted and analyzing the buffered video data.

The estimation of the number of bits may further comprise determining a number of bits for an already encoded sequence of the video stream corresponding to the GOP. Hence, an already encoded sequence of the video stream may be smoothed and transmitted. Provided a short latency is less important, this may be advantageous, as an essentially exact average bitrate may be calculated from a captured and stored GOP. Hence, this may further provide a refined estimation of the number of bits of a GOP.

The method may further comprise, during transmission of the video frames in the GOP, updating the average minimum video bitrate across remaining not yet transmitted frames of the GOP based on an actual number of bits of already transmitted frames of the GOP. The average minimum video bitrate may thereby be updated according to real time circumstances in the scene captured by the video camera. The dynamic updating the average minimum bitrate may hence be done during transmission of the video frames in the GOP, which may further facilitate avoiding overload of the network. This may further be preferable should the GOP time length, i.e., a time interval during which the GOP is transmitted, be relatively long. Alternatively or additionally, this may lower the average minimum video bitrate should a preceding GOP from which the transmission bitrate of the present GOP be subject to rapid changes in the captured scene while the present GOP is subject to a relatively static captured scene.

According to a second aspect, there is provided a computer implemented method for controlling a simultaneous transmission of a plurality of video streams, the method comprising individually for each of the plurality of the video streams performing the method according to the above-mentioned features of the first aspect.

Should intra-frames of a plurality of video streams be transmitted simultaneously, an overload of the network may occur as of addition of a plurality of bitrate spikes resulting thereof. This method may facilitate smoothing of the data traffic to be transmitted, which thereby may avoid such an overload of the network. Hence, data packet losses or reduction of video resolution, etc., may be avoided.

The method according to the second aspect may further comprise individually setting the latency requirement for the transmission of each of the plurality of video streams so that the latency requirement is different for each of the plurality of video streams. This may be advantageous, should different types of video cameras among a plurality of video cameras be used, and/or different resolutions, GOP lengths, etc., in video cameras of a plurality of video cameras of a same type be used. This may facilitate enhancing the dynamic properties of the method.

The method according to the second aspect may further comprise individually setting the latency requirement for the transmission of each of the plurality of video streams based on a type of video stream of each of the plurality of video streams. A type of video stream may be a live stream, a non-live stream, or the like. Different video resolutions may be applicable for different types of the video stream. For instance, the non-live stream may have a larger video resolution than the live stream. Besides a higher video resolution, the individual setting of the latency requirement may allow to set the transmission bitrate of the non-live stream essentially constant which may prevent data losses. Hence, latency may be significantly larger for the non-live stream compared to the live stream. Further, a bandwidth of the network may be exploited more efficiently, thereby allowing stacking a larger number of such non-live streams for simultaneous transmission over the network.

According to a third aspect, there is provided a non-transitory computer-readable storage medium having stored thereon instructions for implementing the method according to the first and/or the second aspect, when executed on a device having processing capabilities.

The above-mentioned features and advantages in connection with the first and the second aspect, when applicable, apply to this third aspect as well. In order to avoid undue repetition, reference is therefore made to the above.

According to a fourth aspect, there is provided a video stream shaper for controlling a transmission of a video stream, the video stream shaper comprising circuitry configured to execute:
    a data size estimating function configured to estimate a number of bits for a group of pictures, GOP, of the video stream to be transmitted,
    a latency setting function configured to set a latency requirement for the transmission of the video stream,
    a bitrate determining function configured to determine an average minimum video bitrate across the GOP based on the estimated number of bits and a time corresponding to a time period represented by a duration of the GOP,
    an output bitrate setting function configured to, for video frames in the GOP, set an output bitrate for transmission of a video frame based on the latency requirement and the average minimum bitrate, and
    a transmitting function configured to transmit the video frame using the output bitrate.

The above-mentioned features and advantages in connection with the first aspect, when applicable, apply to this second aspect as well. In order to avoid undue repetition, reference is therefore made to the above.

The data size estimating function may further be configured to statistically analyze a number of bits for one or more preceding GOPs in the video stream.

The data size estimating function may further be configured to buffer video data corresponding to the GOP to be transmitted and analyzing the buffered video data.

The data size estimating function may further be configured to determine a number of bits for an already encoded sequence of the video stream corresponding to the GOP.

The circuitry may further comprise a bitrate updating function configured to update the average minimum video bitrate across remaining not yet transmitted frames of the GOP based on an actual number of bits of already transmitted frames of the GOP.

The circuitry may further be configured to execute a main function configured to, individually for each of a plurality of video streams, execute the above-mentioned functions of the video stream shaper.

The above-mentioned features of the method, when applicable, apply to this second aspect as well. In order to avoid undue repetition, reference is made to the above.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present disclosure, will be better understood through the following illustrative and non-limiting detailed description of preferred embodiments, with reference to the appended drawings, where the same reference numerals will be used for similar elements, wherein.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person.

Figure 1:
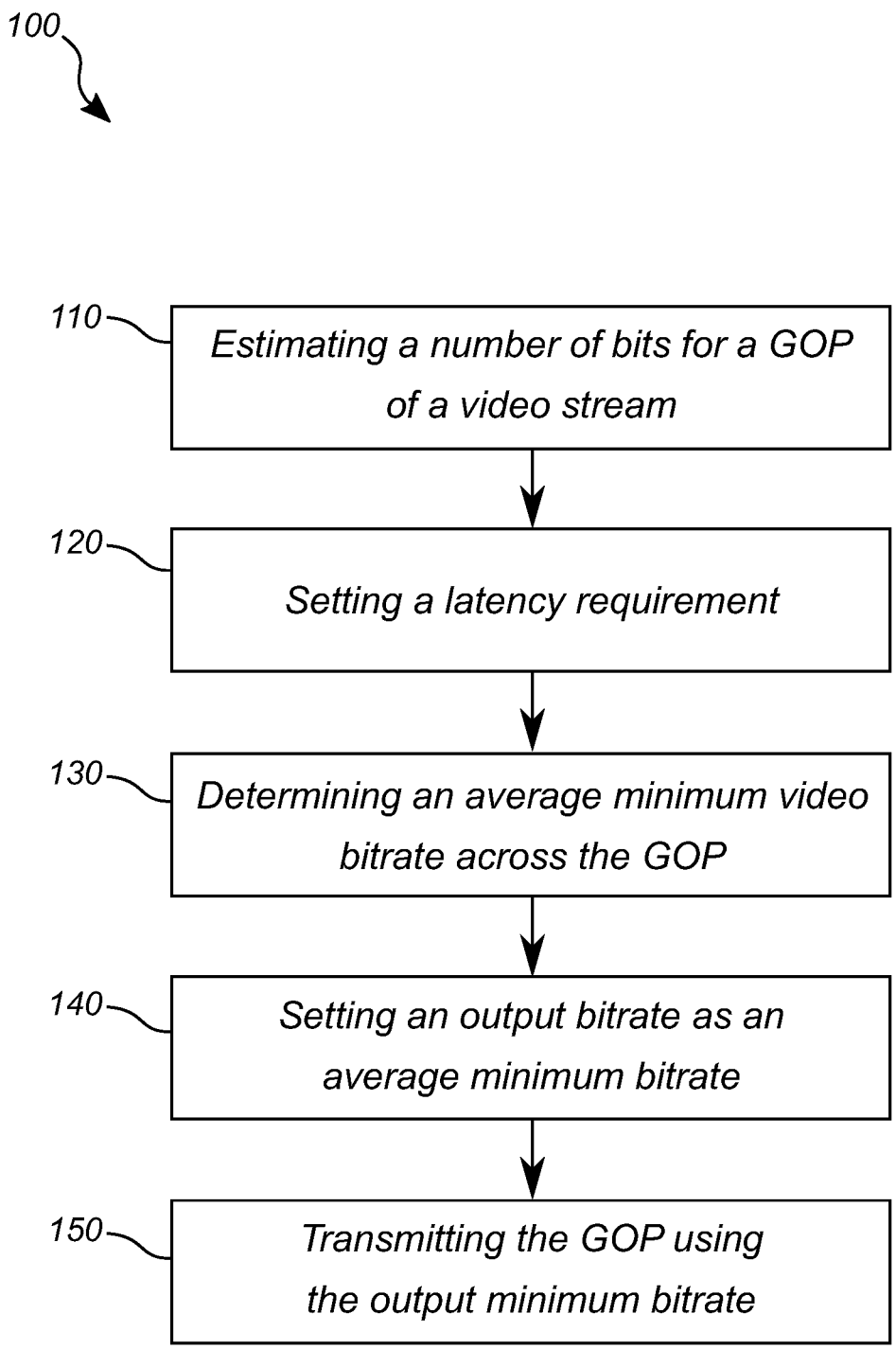
FIG. 1 schematically shows a flow chart of a method for controlling a transmission of a video stream.

In connection with FIG. 1 there is shown a flow chart of a computer implemented method 100 for controlling a transmission of a video stream. The method 100 may be implemented on any suitable device. According to a non-limiting example the method 100 can be implemented in a video camera, especially a digital monitoring video camera. Other examples are a stationary or portable computer, a network gateway, etc. The method may be viewed as a so-called traffic shaper for data traffic to be transmitted over a network. The method 100 comprises estimating 110 a number of bits for a group of pictures, GOP, of the video stream to be transmitted. The GOP may comprise different picture types:

An intra coded picture, I-frame, being a picture that is coded independently of all other pictures. Each GOP begins, in decoding order, with an I frame. An I-frame may alternatively be referred to as a keyframe.

A predictive coded picture, P-frame, being a picture containing motion compensated difference information relative to a previously decoded picture being a P-frame or an I frame. A P-frame may be created by pixel-level analysis, block-level analysis, or vector analysis.

A bipredictive coded picture, B-frame, being a picture containing motion compensated difference information relative to a previously decoded picture (I-frame or P-frame) and a picture that follows the B-frame (I-frame of P-frame). P-frames and B-frames are collectively often referred to as inter-frames.

A number of bits of an intra-frame is generally significantly larger than a number of bits of an inter-frame that follows the intra-frame, as the inter-frame typically only comprises differences relative to the intra-frame. This may, however, not be the case when capturing scenes involving a lot of motion. Hence, in, e.g., camera surveillance during night, where little or nothing may change in a scene being captured by the camera during specific time intervals, a file size of an inter-frame in a captured video stream sequence may be substantially negligible. Furthermore, in such a situation a relatively large GOP length and/or a low frame rate may be used, where the GOP length refers to a number of frames between two subsequent intra-frames. However, in order to adequately capture a rapid change in the scene being captured by the camera in a camera surveillance, a relatively short GOP length may be preferable regardless of a present, (possibly low) activity in the scene being captured. Throughout this disclosure the discussion of pictures in a GOP exclusively regards I frames and P frames. The skilled person realizes that the other types of frames, i.e., B-frames, may be regarded within the scope of the claims.

Further, a static GOP length is considered throughout this disclosure, although the skilled person appreciates that a dynamic GOP length may be implemented to save bandwidth, facilitate data traffic over a network, etc. When describing/discussing a size of a video frame (I-frame or P-frame), it is appreciated that reference is made to a corresponding disk space required to store such a video frame. Hence, it is understood that an I-frame being larger than a P-frame is equivalent to the I-frame requiring a larger disk space for storing the I-frame compared to the same for the P-frame. The terms "size" and "bit size" may occasionally be interchangeably used.

The estimation of the number of bits for the GOP of the video stream to be transmitted may be performed by analyzing one or more already transmitted GOPs in the video stream. By analyzing a plurality of already transmitted GOPs, a statistical trend, based on the number of bits of respective GOP of the already transmitted GOPs, may be used for a relatively accurate estimation of the number of bits for the GOP to be transmitted. Hence, the method may comprise statistically analyzing a number of bits for one or more preceding GOPs in the video stream. The statistical analysis of the number of bits for one or more preceding GOPs in the video stream may utilize a stochastic approach in that a bitrate may be selected such that a risk of introducing a latency is below a threshold probability. The threshold probability may preferably be relatively low. For instance, should the camera capture a video sequence of a relatively static scene, P-frames of a specific GOP in the video sequence are typically much smaller than the I-frame of the specific GOP. The statistical analysis may then estimate a suitable bitrate to be used in subsequent GOPs. The statistical analysis may further comprise determining a trend in the scene which the camera captures. By way of example, the trend may account for an increasing rate of change of movements in the scene, which thereby may result in larger P-frames. This may further optimize the method for smoothening the corresponding data traffic transmitted over the network.

The method 100 further comprises setting 120 a latency requirement for the transmission of the video stream. As per the above, the latency requirement is a requirement on a time difference between capturing/generation of video frame data and transmission of the same. The latency requirement may be a maximum latency which shall not be exceeded. The latency requirement may occasionally be denoted latency. Hence, errors and potentially induced undesired latency built up and increased over time caused by the estimated video bitrate across a GOP to be transmitted may be prevented. The latency requirement may be set by the user. The latency requirement may depend on a user experience, network capacity, a type of scene to be monitored, or the like. By way of example, a camera monitoring a gate and being used for real-time human communication may require nearly real-time transmission of data, e.g., a 30 ms latency. Conversely, for a camera monitoring a car park, the latency may be significantly higher, e.g., 0.5 s. A target time at which the traffic shaper should have transmitted all data of one or more GOPs may further be computed based on the frame rate and the GOP length. Hence, the target time may be viewed as a time stamp on which transmission of a subsequent I-frame is done in real time.

The method 100 further comprises determining 130 an average minimum bitrate across the GOP based on the estimated number of bits and a time corresponding to a time period represented by a duration of the GOP. The average minimum bitrate across the GOP may depend on a video resolution. That is, provided a short latency is desired, e.g., in a live stream, an average minimum bitrate across a GOP in the live stream may be relatively low, especially for a scene, which the live stream camera captures, is relatively visually static. The average minimum video bitrate across the GOP may be defined based on how much data that is needed to be transmitted during each frame period such that all video data corresponding to the GOP will be transmitted during a GOP period.

The method 100 further comprises, for video frames in the GOP, setting 140 an output bitrate for transmission of a video frame based on the latency requirement and the average minimum video bitrate, and transmitting 150 the video frame using the output bitrate. Here, transmission of each video frame in the GOP is thereby considered individually. The output bitrate may be updated based on the estimated number of bits and the target time at which a pushing of the frames to be transmitted should have been completed.

Figure 2A:
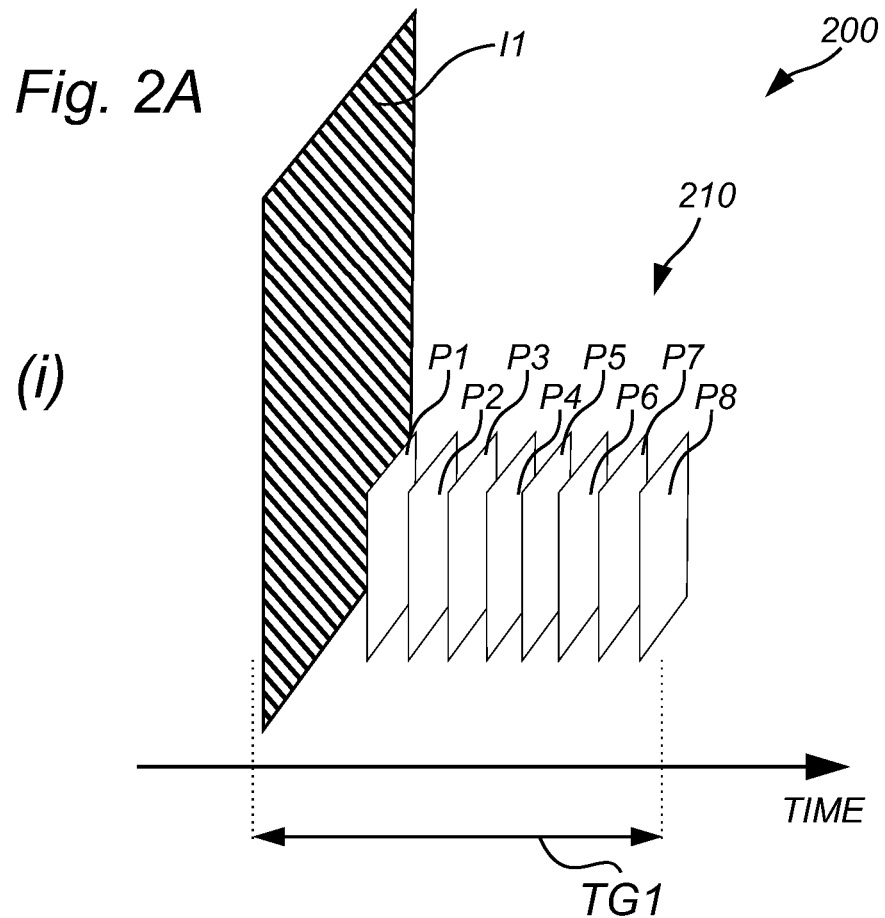
FIGS. 2A-C schematically show a transmission over time of data traffic of a group of pictures, GOP.
Figure 2A:
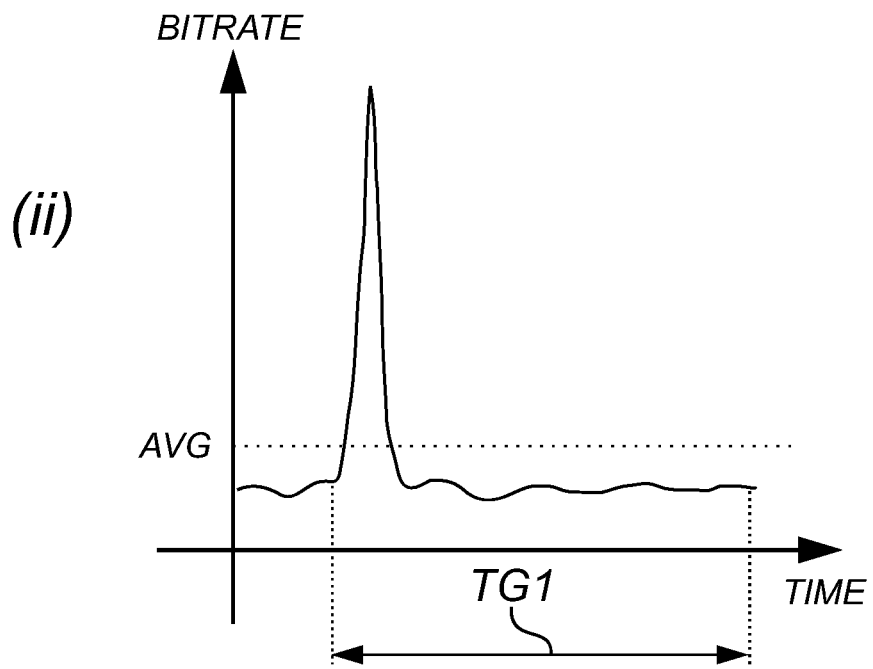
Figure 2B:
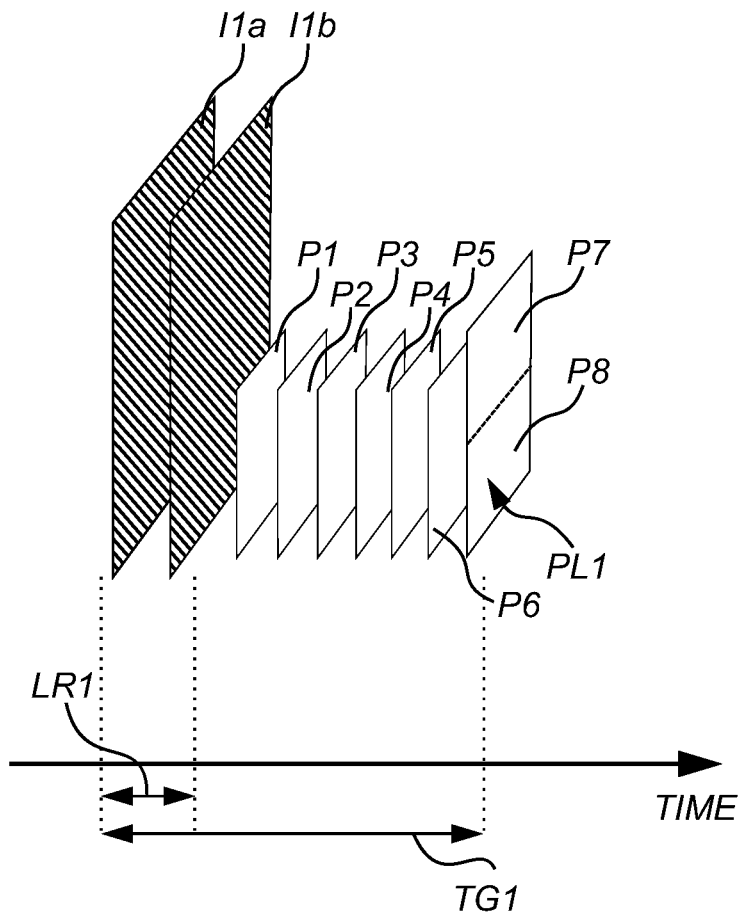
Figure 2B:
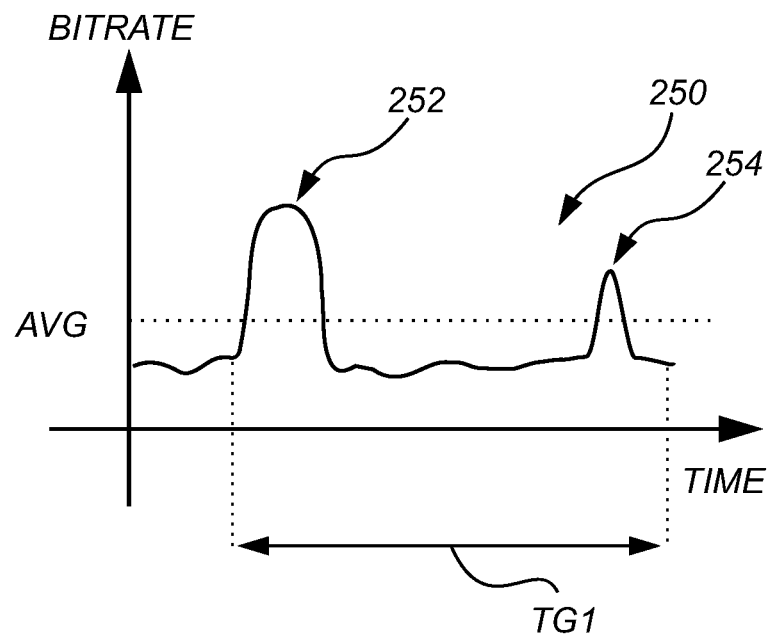
Figure 2C:
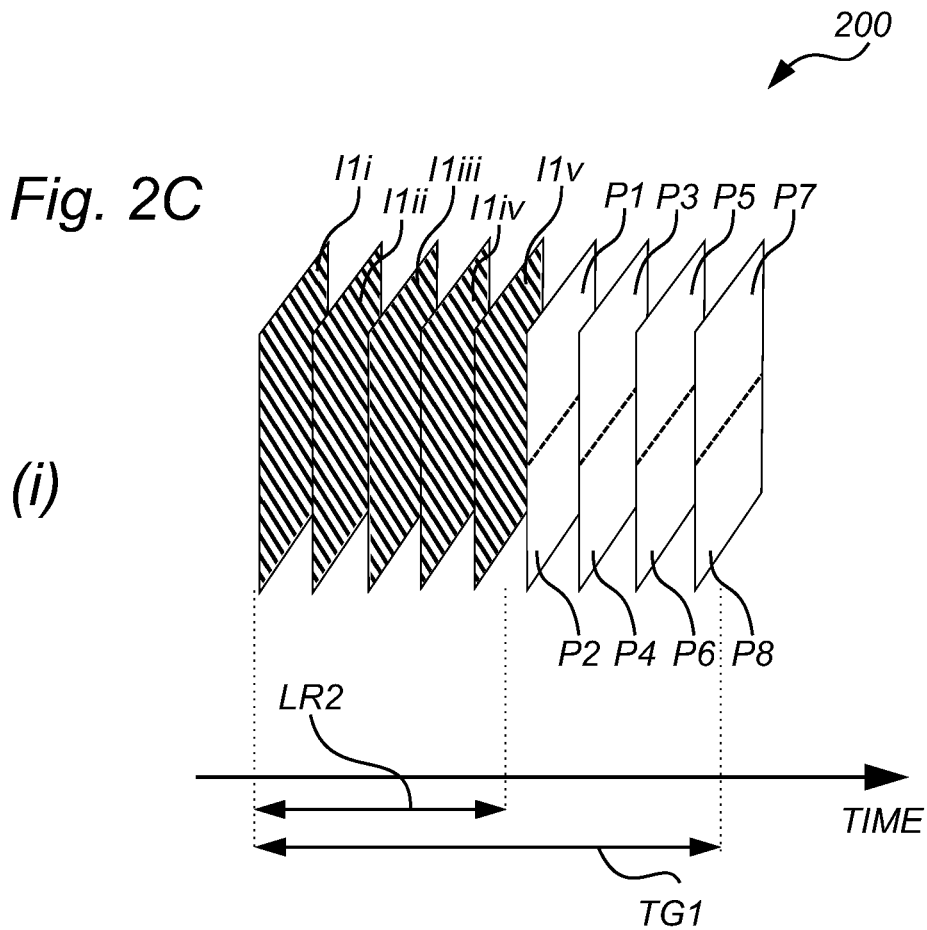
Figure 2C:
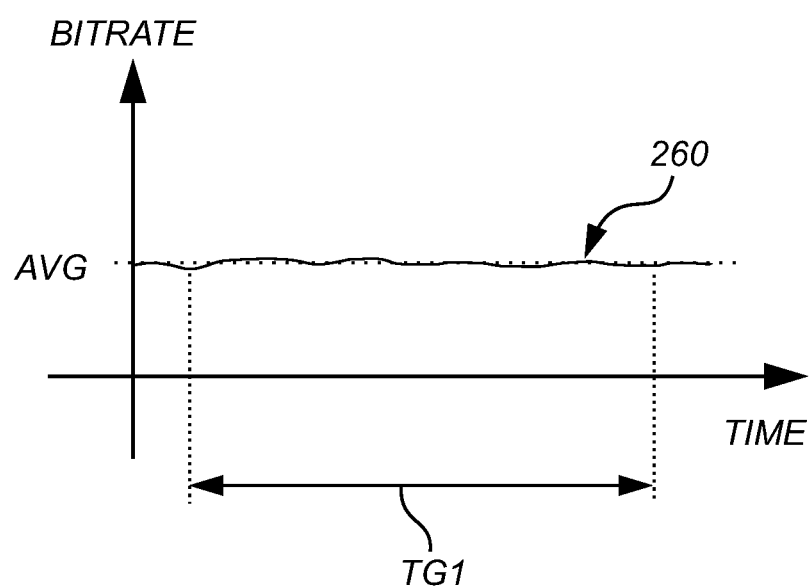

FIGS. 2A-C pictorially summarize the method 100. Herein a GOP 200 is exemplified comprising one I-frame I1 and eight P frames P1-P8, which should not be construed as limiting nor confuse the skilled person. That is, any adequate number of P-frames may be possible within the scope of the claims. In absence of any latency, transmission of a video frame may generally be done during any adequate time interval. Such a time interval may preferably be shorter than or equal to a frame rate depending time interval corresponding to an elapsed time between two subsequent captured frames, as qualitatively shown in FIGS. 2A-C. Should the time interval be significantly shorter than the frame rate depending time interval the corresponding bitrate curve would have had a narrow bitrate spike for each transmitted P-frame, despite a possibly insignificant size of respective P frame. Again, the I-frame is seen being significantly larger than each of the subsequent P-frames. Hence, this example suggests relatively moderate changes in the captured scene. A typical frame rate may be 30 frames per second, fps. A GOP length may, e.g., be 30 or 60 frames. Hence, for the frame rate 30 fps and for the GOP length 60 frames, a duration of the GOP is two seconds. Other adequate frame rates and GOP lengths are possible within the scope of the claims, as readily appreciated by the skilled person.

In FIG. 2A there is schematically shown an ordinary transmission over time of data traffic of a GOP 200, where a transmission bitrate exhibits a relatively narrow spike during transmission of the I-frame. In this toy example, the GOP 200 is assumed having one I-frame, I1, and a group of P-frames 210 comprising eight P-frames, P1-P8. The apparent "area" of respective frame of the GOP 200 qualitatively indicate a relative bit size of the frames in the GOP. The frames shown in FIG. 2A(i) may be viewed as data packets. Hence, each frame I1; P1-P8 may be viewed as a data packet to be pushed over the network. Pushing data packets in this way is equivalent to have a minimal latency, since each individual data packet is transmitted as soon as a corresponding video frame has been captured. Generally, and also seen in this example, the I frame I1 has a significantly larger bit size compared to the subsequent P frames P1-P8, where the P frames P1-P8 all are assumed having substantially similar bit sizes, although bit sizes within an authentic group of P frames may in general differ.

In FIG. 2B there is schematically shown a smoothening over time of a GOP 200. The GOP 200 is smoothened according to the method 100 upon transmission of the GOP 200. Herein, a first latency requirement LR1 is set, defining a time interval during which the bits of the I-frame are to be pushed over the network. The I-frame I1 shown in FIG. 2A is here split up into two data packets and pushed over the network during a time interval corresponding to pushing two frames, e.g., the I-frame I1 and a first P-frame P1 of FIG. 2A. Hence, the I-frame I1 shall not be interpreted as being split up in two different frames, but rather split up in two different data packets. When the GOP 200 has been transmitted over the network and played on a receiver side, the corresponding video sequence is played in normal speed and delayed by a time similar to the latency requirement. The smoothening requires that the remaining P-frames P1-P8 of the GOP 200 must be tied up in larger packets in order for the GOP 200 to be transmitted before a subsequent GOP starts. In this example, for the GOP, herein comprising the data packets I1$a$, I1$b$, P1-P6, and a larger P-frame packet PL1 comprising a seventh P7 and an eighth P8 P-frame, to be pushed within the target time TG1, a last data packet may be a data packet comprising the seventh P7 and the eighth P8 P frame. Any pair of P-frames may equally well be used to constitute a similar data packet, e.g., the first P-frame P1 and the second P-frame P2, etc. This may result in a corresponding bitrate curve having a first bitrate peak 252 corresponding to a bitrate when pushing the I-frame packets I1$a$ and I1$b$ over the network. Similarly, a second bitrate peak 254 may occur in the bitrate curve 250 when pushing the larger P-frame packet PL1 over the network. In general, a data packet may have a size of approximately 1.5 kB. A relatively large I-frame may be split up in thousands of data packets. Frames may be transmitted by such data packets in at least three ways: (i) one frame in one data packet, (ii) a plurality of frames in one data packet, or (iii) one frame in a plurality of data packets. In principle, it may further be possible to split up a certain number of frames into another number of data packets. For instance, two data packets may contain three frames in total, where each data packet contains data corresponding to 1.5 frame.

In FIG. 2C there is schematically shown another example of a smoothening data corresponding to the GOP 200 over time of data traffic being smoothened according to the method 100 upon transmission of the GOP 200. Herein, a second latency requirement LR2 is set, defining a time interval during which the I-frame is to be pushed over the network. The I-frame I1 shown in FIG. 2A is here split up into five data packets I1$i$-I1$v$ of substantially equal bit sizes. The P-frames P1-P8 are here tied up in data packets comprising two P-frames each, i.e., a first P-frame packet comprising the first P1 and the second P2 P-frame, a second P-frame packet comprising a third P3 and a fourth P4 P frame, etc. This example may result in a corresponding bitrate curve 260 having substantially constant bitrate when pushing the I-frame packets I1$i$-I1$v$ and the subsequent P-frame packets. It is appreciated that a larger time interval value of the latency requirement may result in a more constant bitrate curve when pushing data packets corresponding to the bits of the GOP 200, and vice versa. The bitrate curve may thereby deviate little or negligible from an average minimum bitrate of the GOP. Hence, the latency requirement may be viewed as a tradeoff between a length of the time interval of the latency requirement and a smoothness of the corresponding bitrate curve. It should be appreciated that the example shown in FIG. 2C may be relatively ideal with respect to the load of the network. Since an estimation of a number of bits for a GOP of the video stream to be transmitted may depend on an already transmitted GOP, variations may occur such that the average bitrate between two GOPs may deviate.

In FIGS. 2A-C, the frame rate may appear being similar to a rate at which data packets corresponding to the frames in the GOP 200 are transmitted. However, the data packets may equally well be transmitted at a lower rate, such that each data packet comprises a plurality of frames, where each data packet is sent during a time period corresponding to the capturing of the frames contained in the data packet.

The estimation 110 of the number of bits may comprise buffering video data corresponding to the GOP to be transmitted and analyzing the buffered video data. Hence, all frames in a GOP may be buffered whereafter a total bit size of all the frames may be calculated as well as an average bitrate required for the GOP to be transmitted during its target time. This may be followed by data packets being pushed at a bitrate that matches the average bitrate of the GOP. In this situation, a relatively large latency may be present although the bitrate may be further smoothened, or even substantially constant while pushing the data packets corresponding to the GOP over the network.

Alternatively, the estimation 110 of the number of bits may comprise determining a number of bits for an already encoded sequence of the video stream corresponding to the GOP. Hence, smoothening of already encoded video data may be possible. This may be preferable in case of pre-buffering should an event be triggered, e.g., a change in a scene captured by the video camera, so that pushing data packets corresponding to a certain passed time interval is possible. Such a certain passed time interval may, e.g., be the foregoing 15 seconds, the foregoing minute, or the like.

The method 100 may further comprise, during transmission of the video frames in the GOP, updating the average minimum video bitrate across remaining not yet transmitted frames of the GOP based on an actual number of bits of already transmitted frames of the GOP. Hence, the average minimum video bitrate may be adjusted according to real time circumstances in the scene captured by the video camera. This embodiment may be preferable should a preceding GOP be subject to rapid changes in the captured scene while the present GOP is subject to a relatively static captured scene.

Figure 3:
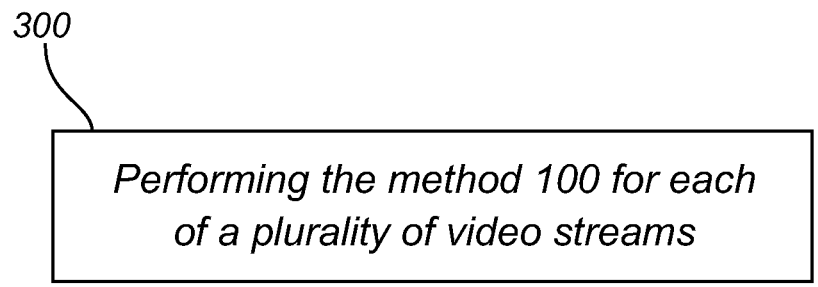
FIG. 3 schematically shows a method for controlling a transmission of a plurality of video streams.

In connection with FIG. 3 there is shown a computer implemented method 300 for controlling a simultaneous transmission of a plurality of video streams. The method 300 comprises individually for each of the plurality of the video streams performing the method 100 described above. The method 300 may thereby comprise smoothening video streams from the plurality of cameras such that a bitrate of the sum of the video streams is below a maximum allowable bitrate for transmission of data over the network. Should a corresponding latency requirement of respective video stream be relatively short, such that bitrate spikes occur for a plurality of the video streams, the second method may delay one or more video streams if necessary in order for the bitrate of the sum of the plurality of video streams to be below the maximum allowable bitrate of the network.

The method 300 may further comprise individually setting the latency requirement for the transmission of each of the plurality of video streams so that the latency requirement is different for each of the plurality of video streams.

The method 300 may further comprise individually setting the latency requirement for the transmission of each of the plurality of video streams based on a type of video stream of each of the plurality of video streams. Types of video stream may comprise a live stream, to be stored for later review, etc. Playback of a live stream may be subject to a delay between capturing and playback of the order of seconds or below. Should the type of video stream be a live stream, the latency requirement may thereby be a relatively short period of time. This may then set constraints on the number of live streams being transmitted over the network. The method 300 may evaluate an activity in respective scene associated with a respective live stream such that less active scenes are assigned with a possibly temporary longer latency requirement. Alternatively, should I-frames of a plurality of live streams be transmitted substantially simultaneously, one or more live streams may be delayed to a certain extent relative to each other.

Instructions for implementing the methods described above are stored on a non-transitory computer-readable storage medium and executed on a device having processing capabilities.

Figure 4:
FIG. 4 highly schematically shows a video stream shaper for controlling a transmission of a video stream.

In connection with FIG. 4 there is, highly schematically, shown a video stream shaper 400 for controlling a transmission of a video stream. The video stream shaper 400 may be implemented on any suitable device. According to a non-limiting example the video stream shaper 400 can be implemented in a video camera, especially a digital monitoring video camera. Other examples are a stationary or portable computer, a network gateway, etc. The above-mentioned features in connection with the method(s) 100; 300, when applicable, apply to video stream shaper 400 as well. In order to avoid undue repetition, reference is therefore made to the above.

The video stream shaper 400 comprises circuitry 420.

The circuitry 420 is configured to carry out overall control of functions and operations of the video stream shaper 400. The circuitry 420 may include a processor, such as a central processing unit, CPU, microcontroller, or microprocessor. The processor is configured to execute program code stored in the circuitry 420 to carry out functions and operations of the video stream shaper 400.

Executable functions, further described below, may be stored on a memory. The memory may be one or more of a buffer, a flash memory, a hard drive, a removable media, a volatile memory, a non-volatile memory, a random access memory, RAM, or other suitable devices. In a typical arrangement, the memory may include a non-volatile memory for long term data storage and a volatile memory that functions as system memory for the circuitry 420. The memory may exchange data with the circuitry 420 over a data bus. Accompanying control lines and an address bus between the memory and the circuitry 420 may be present.

Functions and operations of the circuitry 420 may be embodied in the form of executable logic routines, e.g., computer-code portions, software programs, etc., that are stored on a non-transitory computer readable medium, e.g., the memory, of the video stream shaper 400 and are executed by the circuitry 420 by, e.g., using the processor. The functions and operations of the video stream shaper 400 may be a stand-alone software application or form a part of a software application that carries out additional tasks related to the video stream shaper 400. The described functions and operations may be considering a method that the corresponding device is configured to carry out. Also, while the described functions and operations may be implemented in a software, such functionality may as well be carried out via dedicated hardware or firmware, or some combination of hardware, firmware and/or software.

The circuitry 420 is configured to execute a data size estimating function 421 configured to estimate a number of bits for a group of pictures, GOP, of the video stream to be transmitted. The circuitry 420 further comprises a latency setting function 422 configured to set a latency requirement for the transmission of the video stream. The circuitry 420 further comprises a bitrate determining function 423 configured to determine an average minimum video bitrate across the GOP based on the estimated number of bits and a time corresponding to a time period represented by a duration of the GOP. The circuitry 420 further comprises an output bitrate setting function configured to, for video frames in the GOP, set an output bitrate for transmission of a video frame based on the latency requirement and the average minimum bitrate. The circuitry 420 further comprises a transmitting function 425 configured to transmit the video frame using the output bitrate.

The data size estimating function 421 may be further configured to statistically analyze a number of bits for one or more preceding GOPs in the video stream.

The data size estimating function 421 may be further configured to buffer video data corresponding to the GOP to be transmitted and analyzing the buffered video data.

The data size estimating function 421 may be further configured to determine a number of bits for an already encoded sequence of the video stream corresponding to the GOP.

The circuitry 420 may further comprise a bitrate updating function configured to update the average minimum video bitrate across remaining not yet transmitted frames of the GOP based on an actual number of bits of already transmitted frames of the GOP.

The circuitry 420 may be further configured to execute a main function 426 configured to, individually for each of a plurality of video streams, execute the functions 421-425 per the above.

The person skilled in the art realizes that the present disclosure by no means is limited to the preferred embodiments described above. On the contrary, many modifications and variations are possible within the scope of the appended claims. For example, a specific video stream shaper 400 may control transmission of a two independent video streams. In such a situation, the latency requirement of one of the two video streams may take properties of the remaining video stream into account to optimize the smoothing of the transmitted data. The skilled person appreciates that this may apply also to more than two independent video streams.

Additionally, variations to the disclosed embodiments can be understood and effected by the skilled person in practicing the claimed disclosure, from a study of the drawings, the disclosure, and the appended claims.

The invention claimed is:

1. A computer implemented method for controlling a transmission of a video stream, the method comprising:
   estimating a number of bits for a group of pictures, GOP, of the video stream to be transmitted, the GOP comprising an intra-frame and one or more inter-frames;
   setting a latency requirement for the transmission of the video stream, wherein the latency requirement is a requirement on a time difference between capturing/generation of video frame data and transmission of the same;
   determining an average minimum video bitrate across the GOP based on the estimated number of bits and a time corresponding to a time period represented by a duration of the GOP;
   for each video frame in the GOP:
      setting an output bitrate for transmission of the video frame based on the latency requirement and the average minimum video bitrate by determining a number of data packets over which the video frame is to be spread or determining that the video frame is to be transmitted in a same data packet as another video frame of the GOP, and
      transmitting the video frame using the output bitrate.

2. The method according to claim 1, wherein estimating the number of bits comprises statistically analyzing a number of bits for one or more preceding GOPs in the video stream.

3. The method according to claim 1, wherein estimating the number of bits comprises buffering video data corresponding to the GOP to be transmitted and analyzing the buffered video data.

4. The method according to claim 1, wherein estimating the number of bits comprises determining a number of bits for an already encoded sequence of the video stream corresponding to the GOP.

5. The method according to claim 1, further comprising, during transmission of the video frames in the GOP, updating the average minimum video bitrate across remaining not yet transmitted frames of the GOP based on an actual number of bits of already transmitted frames of the GOP.

6. A computer implemented method for controlling a simultaneous transmission of a plurality of video streams, the method comprising, individually for each of the plurality of the video streams:
   estimating a number of bits for a group of pictures, GOP, of the video stream to be transmitted, the GOP comprising an intra-frame and one or more inter-frames;
   setting a latency requirement for the transmission of the video stream, wherein the latency requirement is a requirement on a time difference between capturing/generation of video frame data and transmission of the same;
   determining an average minimum video bitrate across the GOP based on the estimated number of bits and a time corresponding to a time period represented by a duration of the GOP;
   for each video frame in the GOP:
      setting an output bitrate for transmission of the video frame based on the latency requirement and the average minimum video bitrate by determining a number of data packets over which the video frame is to be spread or determining that the video frame is to be transmitted in a same data packet as another video frame of the GOP, and
      transmitting the video frame using the output bitrate.

7. The method according to claim 6, further comprising individually setting the latency requirement for the transmission of each of the plurality of video streams so that the latency requirement is different for each of the plurality of video streams.

8. The method according to claim 6, further comprising individually setting the latency requirement for the transmission of each of the plurality of video streams based on a type of video stream of each of the plurality of video streams.

9. A non-transitory computer-readable storage medium having stored thereon instructions for implementing a method, when executed on a device having processing capabilities, the method for controlling a transmission of a video stream comprising:
   estimating a number of bits for a group of pictures, GOP, of the video stream to be transmitted, the GOP comprising an intra-frame and one or more inter-frames;
   setting a latency requirement for the transmission of the video stream, wherein the latency requirement is a requirement on a time difference between capturing/generation of video frame data and transmission of the same;

determining an average minimum video bitrate across the GOP based on the estimated number of bits and a time corresponding to a time period represented by a duration of the GOP;

for each video frame in the GOP:

setting an output bitrate for transmission of the video frame based on the latency requirement and the average minimum video bitrate by determining a number of data packets over which the video frame is to be spread or determining that the video frame is to be transmitted in a same data packet as another video frame of the GOP, and transmitting the video frame using the output bitrate.

10. A video stream shaper for controlling a transmission of a video stream, the video stream shaper comprising circuitry configured to execute:

a data size estimating function configured to estimate a number of bits for a group of pictures, GOP, of the video stream to be transmitted, the GOP comprising an intra-frame and one or more inter-frames;

a latency setting function configured to set a latency requirement for the transmission of the video stream, wherein the latency requirement is a requirement on a time difference between capturing/generation of video frame data and transmission of the same;

a bitrate determining function configured to determine an average minimum video bitrate across the GOP based on the estimated number of bits and a time corresponding to a time period represented by a duration of the GOP, an output bitrate setting function configured to, for each video frame in the GOP, set an output bitrate for transmission of the video frame based on the latency requirement and the average minimum bitrate by determining a number of data packets over which the video frame is to be spread or determining that the video frame is to be transmitted in a same data packet as another video frame of the GOP, and a transmitting function configured to transmit the video frame using the output bitrate.

11. The video stream shaper according to claim 10, wherein the data size estimating function is further configured to statistically analyze a number of bits for one or more preceding GOPs in the video stream.

12. The video stream shaper according to claim 10, wherein the data size estimating function is further configured to buffer video data corresponding to the GOP to be transmitted and analyzing the buffered video data.

13. The video stream shaper according to claim 10, wherein the data size estimating function is further configured to determine a number of bits for an already encoded sequence of the video stream corresponding to the GOP.

14. The video stream shaper according to claim 10, wherein the circuitry further comprises a bitrate updating function configured to update the average minimum video bitrate across remaining not yet transmitted frames of the GOP based on an actual number of bits of already transmitted frames of the GOP.

* * * * *